US010136264B2

(12) United States Patent
Scarafia et al.

(10) Patent No.: US 10,136,264 B2
(45) Date of Patent: Nov. 20, 2018

(54) INDOOR LOCATING MOBILE TERMINALS IN A MOBILE CELLULAR TELECOMMUNICATION NETWORK

(75) Inventors: Simone Scarafia, Vigone (IT); Alessandro Striuli, Mestre (IT)

(73) Assignee: Sisvel Technology S.R.L. (IT)

( * ) Notice: Subject to any disclaimer, the term of this patent is extended or adjusted under 35 U.S.C. 154(b) by 0 days.

(21) Appl. No.: 13/984,503

(22) PCT Filed: Feb. 23, 2012

(86) PCT No.: PCT/IB2012/050838
§ 371 (c)(1),
(2), (4) Date: Aug. 8, 2013

(87) PCT Pub. No.: WO2012/114304
PCT Pub. Date: Aug. 30, 2012

(65) Prior Publication Data
US 2013/0316740 A1    Nov. 28, 2013

(30) Foreign Application Priority Data
Feb. 24, 2011   (IT) .............................. TO2011A0160

(51) Int. Cl.
*H04W 4/04*     (2009.01)
*H04W 64/00*    (2009.01)
(Continued)

(52) U.S. Cl.
CPC ........... *H04W 4/043* (2013.01); *H04W 64/00* (2013.01); *H04W 4/90* (2018.02); *H04W 76/50* (2018.02)

(58) Field of Classification Search
CPC ............................... H04W 48/16; H04M 3/42
(Continued)

(56) References Cited
U.S. PATENT DOCUMENTS
6,317,386 B1   11/2001   Ward
7,242,303 B2   7/2007    Patel et al.
(Continued)

FOREIGN PATENT DOCUMENTS
CN  101849195 A   9/2010
JP  2003-9212 A   1/2003
(Continued)

OTHER PUBLICATIONS

International Preliminary Report and Written Opinion dated Aug. 27, 2013, issued in PCT Application No. PCT/IB2012/050838, filed Feb. 23, 2012.
(Continued)

*Primary Examiner* — Gary Lafontant
(74) *Attorney, Agent, or Firm* — Workman Nydegger

(57) ABSTRACT

A process for indoor location of a mobile cellular terminal (3) equipped with a transceiver apparatus capable of communicating with a mobile cellular telecommunication network (2), through a system including at least one transmitter apparatus (5a-5g), present inside an indoor environment (6;A-G), and at least one of the mobile terminals (3) equipped with at least one receiver apparatus (4), capable of receiving data transmitted by at least one of the transmitter apparatuses (5a-5g) present inside the indoor environment (6;A-G) and of relaying them to a locating station (7) through the transceiver apparatus over the mobile cellular telecommunication network (2), including the following steps, wherein: at least one of the transmitter apparatuses (5a-5g) present in the indoor environment (6;A-G) transmits at least one identifier (ID;<A>-<G>) of the indoor environment (6;A-G) where the transmitter apparatus (5a-5g) is situated; the receiver apparatus (4) of the mobile terminal (3) receives the identifier (ID;<A>-<G>) transmitted by at least one of the transmitter apparatuses (5a-5g); the transceiver apparatus of the mobile terminal (3) relays the identifier (ID;<A>-<G>) or data associated therewith to the locating station (7) through the mobile cellular telecommunication network (2); and the locating station (7) locates the mobile terminal (3) depending on the identifier (ID;<A>-<G>) or the data associated therewith received from the mobile terminal (3) through the mobile cellular telecommunication network (2), by associating the identifier (ID;<A>-<G>)

(Continued)

with the position of the indoor environment (6;A-G) after consulting an existing database (9) accessible to the locating station (7), the database (9) including information associating the identifier (ID; <A>-<G>) with data relating to the position of the indoor environment (6;A-G) where the transmitter (5a-5g) that transmitted it is situated, and wherein the identifier (ID) is associated with at least one fixed communication terminal (8) present inside the indoor environment (6), and wherein the data relating to the position of the indoor environment includes a geographic address (LOCATION) of the fixed communication terminal (8).

11 Claims, 4 Drawing Sheets

(51) Int. Cl.
 *H04W 76/50* (2018.01)
 *H04W 4/90* (2018.01)

(58) Field of Classification Search
 USPC .............. 455/456.5, 41.2, 315, 456.3, 417; 370/315
 See application file for complete search history.

(56) References Cited

U.S. PATENT DOCUMENTS

| | | |
|---|---|---|
| 7,305,245 B2 | 12/2007 | Alizadeh-Shabdiz et al. |
| 7,388,490 B2 | 6/2008 | Freitag et al. |
| 7,589,616 B2 | 9/2009 | Klatsmanyi et al. |
| 2004/0061646 A1* | 4/2004 | Andrews et al. .............. 342/463 |
| 2007/0032225 A1* | 2/2007 | Konicek ........... H04M 1/72513 455/417 |
| 2008/0113674 A1* | 5/2008 | Baig .......................... 455/456.3 |
| 2009/0291641 A1* | 11/2009 | Sato et al. ................. 455/67.11 |
| 2010/0048163 A1 | 2/2010 | Parr et al. |
| 2010/0144371 A1* | 6/2010 | Savoor ...................... 455/456.3 |
| 2010/0151789 A1 | 6/2010 | Suzuki et al. |
| 2010/0290504 A1 | 11/2010 | Torimoto et al. |
| 2010/0317345 A1* | 12/2010 | Futaki et al. ................. 455/436 |
| 2015/0011249 A1* | 1/2015 | Siliski ..................... G01S 19/48 455/456.6 |

FOREIGN PATENT DOCUMENTS

| | | |
|---|---|---|
| JP | 2003-274441 A | 9/2003 |
| KR | 2010-0086596 | 8/2010 |

OTHER PUBLICATIONS

International Search Report dated May 29, 2012, issued in PCT Application No. PCT/IB2012/050838, filed Feb. 23, 2012.

* cited by examiner

INDOOR LOCATING MOBILE TERMINALS IN A MOBILE CELLULAR TELECOMMUNICATION NETWORK

BACKGROUND OF THE INVENTION

1. Field of the Invention

The present invention relates to a process and a system for indoor location of mobile terminals in a mobile cellular telecommunication network, as well as to an associated mobile terminal.

2. Present State of the Art

As known, locating mobile terminals has become particularly important because, both in the USA and in Europe, regulations have been defined which make it mandatory for operators of wireless infrastructures to provide the position of users calling the single emergency number to the emergency centres receiving such calls. In particular, in the USA this service is called E-911 (Enhanced-911); the document written by the Federal Communication Commission, "*A Report on Technical and Operational Issues Impacting The Provision of Wireless Enhanced* 911 *Services*", mentions the possibility of locating a user with variable accuracy from 50 to 300 meters, depending on the technology in use.

A similar service is currently being provided in Europe in compliance with the *DIRECTIVE* 2002/22/*EC OF THE EUROPEAN PARLIAMENT AND OF THE COUNCIL of* 7*th March* 2002, which requires that: "Member States shall ensure that undertakings which operate public telephone networks make caller location information available to authorities handling emergencies, to the extent technically feasible, for all calls to the single European emergency call number '112'".

For fixed telephone apparatuses, the user location service is already available due to the use of databases made available by telephone companies, which associate the telephone number with the geographic address of the location of the apparatus.

The location service requires the availability of the following data in "push" mode (i.e. directly sent to the information systems of the 911/112 operational stations and displayed as soon as the first ring occurs on the monitor of the station operator):
  address, street or square and number;
  geographic coordinates (x and y);
  caller telephone number.

As far as mobile terminal location is concerned, two standards exist which describe different approaches from the architectural standpoint:
  according to the first standard, described in document "3*GPP Functional stage* 2 *description of Location Services* (*LCS*)", locating messages are exchanged between the terminal to be located and the locating server on the signalling channel (Control Plane approach);
  according to the second standard, described in document "User Plane Location Protocol", locating messages are sent between the terminal to be located and the locating server through a client-server approach, over a GPRS or SMS connection (User Plane approach).

In both cases, the messages exchanged between the terminal and the server contain data useful for location purposes, among which:
  telephone number (MSID);
  location technique identifier;
  data and measurements dependent on the location technique in use.

As regards mobile telephone apparatuses in outdoor environments, location typically takes place by means of GNSS (Global Navigation Satellite System) satellite systems, the most widespread of which is GPS (Global Positioning System). Said system has an accuracy of approx. 10 meters; for positioning applications in conditions of poor satellite visibility, as in urban centres or within indoor environments, GPS is not very efficient due to insufficient accuracy and to the fact that, in order to operate correctly, it requires a visibility line in the connection between the receiver and at least four satellites.

In order to overcome the problem of location in urban centres with a high density of buildings, a number of location techniques have been proposed which are based on GSM/UMTS cellular network measurements: since emergency calls from a mobile terminal derive from objects equipped with such technologies, this allows to implement the service in a more efficient way.

The main proposals described in the literature are:
Enhanced Cell-ID (E-CID), wherein the position of the mobile terminal is identified through that of the radio base station serving it, by estimating the distance therefrom by means of measurements exchanged with the terminal during the signalling steps (Network Measurements Report, Timing Advance);
Uplink Time Difference of Arrival (U-TDOA), wherein the position of the terminal is estimated by calculating the difference in the time of arrival of the uplink signal from the terminal to at least three different radio base stations;
Advanced Forward Link Trilateration (AFLT), wherein the terminal collects measurements of power/time/angle of the signal coming from at least three radio base stations and forwards them to the network, which then uses them to carry out the triangulation;
Enhanced Observed Time of Difference (E-OTD), wherein the terminal estimates its own position by calculating the difference in the time of arrival of the downlink signal from at least three different radio base stations.

The E-CID technique ensures a level of accuracy that depends on cell coverage and may not be sufficient for locating an indoor call; the other techniques based on triangulation/trilateration are more accurate, but require the terminal to communicate with at least three radio base stations; moreover, the U-TDOA technique, which de facto is used in E-911 in the USA, requires modifications to the cellular network.

One technique which is mentioned in the literature as being also operational within indoor environments is Assisted-GPS, which allows the terminal equipped with a GPS receiver to receive some assistance data (number and ID of satellites in sight, ephemerides, GPS-time) through another GPS located, for example, in a radio base station: this allows speeding up the Time-To-First-Fix of a receiver (since it already knows which satellites to look for and the position thereof). This may also be exploited by the receiver, which can spend more time calculating pseudoranges, so that also satellites received at lower power can be located, which is a situation typically found in indoor environments: this can only be attained by using the so-called High Sensitive GPS receivers, the integration of which into a terminal is very costly.

The need for locating objects or people within buildings has led to conceiving many methods capable of using technologies relying on local infrastructures, which methods allow locating terminals inside the infrastructured area. The main technologies are based on:
  infrared or ultrasonic sensors;
  Wi-Fi/IEEE802.11 terminals;
  ZigBee/IEEE802.15 terminals;
  RFID platforms.

The most accurate solutions, which are also the most expensive ones, are based on a triangulation of the infrared or ultrasonic signal coming towards the terminal from multiple sensors: in addition to being very expensive, such techniques only offer short-range coverage and suffer more from the multipath effect. One example of such a solution is described in U.S. Pat. No. 6,317,386, which employs an ultrasonic system for indoor location.

The use of wireless local area networks (WLAN) for location services is widespread. Most of the research in this field, which can be found in the literature, concerns the IEEE 802.11 Wi-Fi standard (in particular releases b and g), which technology has now become stably integrated into all latest-generation smartphones. In this case as well, the triangulation of signals coming from multiple access points turns out to be sensitive to the multipath effect; to solve this problem, other location techniques have been created, known as fingerprinting, which are based on a calibration step wherein power measurements of the radioelectric signals coming from multiple access points (e.g. WLAN access points) in some points of the area to be located are taken and saved into a database. During the location step, the terminal measures the power levels of the signals coming from multiple access points and correlates them with those stored in the database, thus locating itself in the position associated with those measurements which are most correlated with those obtained in real time. Although less sensitive to the multipath effect, this method is poorly scalable and is time-consuming, in that it requires that the calibration step be repeated every time an access point is added or the arrangement of the objects in the environment is changed. One example of indoor location based on fingerprinting techniques is described in U.S. Pat. No. 7,305,245.

Solutions based on technologies using low transmission power are less costly and more flexible from the architectural viewpoint, in that they make up for poor coverage by increasing the number of reference stations, exploiting the possibility of using them in embedded mode in other devices with which they share the same power supply.

One of these technologies is ZigBee, which is based on the IEEE802.15 protocol and is widely used in the field of sensor network location, by exploiting the capability of communication among the nodes.

Another widespread technology is RFID (Radio-Frequency IDentification), created for the automatic identification of objects, animals or people (AIDC Automatic Identifying and Data Capture), which is based on the ability to store data associated with what must be identified by means of electronic devices, called RFID tags or transponders (hereafter also referred to simply as tags) that can communicate such information to remote reader systems called RFID readers (hereafter also referred to simply as readers) in two modes:
  passive, wherein the tag only transmits the data when it is interrogated by the reader in the immediate vicinity;
  active, wherein the tag, equipped with a battery, transmits the information at regular intervals.

In the location field the active mode is generally used, wherein:
  the objects or people to be located are equipped with RFID tags that transmit a signal that may contain data;
  multiple RFID readers, arranged in the environment where location must take place, which act simultaneously as base stations for location purposes and as aggregators of the signals sent by the RFID tags, which must then be processed by a central server;
  a central server processes the signals received from the various readers and calculates the position of the tags based on characteristics of the signals (power of an RFID tag received from multiple readers, difference in the time of arrival of a signal from multiple RFID readers) and on the knowledge of the readers' positions.

Location techniques may vary from fingerprinting to triangulation of power measurements or of time measurements, in the UWB (UltraWide Band) case.

In this field, many solutions are currently being developed, called RTLS (Real Time Locating System), for locating and tracking objects and people within indoor areas (tracking of doctors or patients in hospitals, tracking of industrial assets, etc.); also, an attempt is being made at making up for lack of standardization by the ISO/IEC body, through the creation of a group that has already published a few standards related to RFID tags transmitting in the 2.4 GHz band.

The LANDMARC solution, described in the article "*LANDMARC: Indoor Location Sensing Using Active RFID*", *Proceedings of the First IEEE International Conference on Pervasive Computing and Communications*, 2003, introduces the reference tag concept, i.e. using some tags as reference stations for location purposes, thereby limiting the reader to act as an aggregator; in this case, the locating server, which knows the reference tag list, receives from the reader signals coming both from these tags and from those to be located, and can thus obtain the position of the latter by means of correlation measurements.

The use of tags as references opens the door to a third type of solution, wherein the reader is associated with the mobile object to be located.

U.S. Pat. No. 7,589,616 proposes to install a multitude of RFID tag devices in a building and to use a reader built in a mobile terminal that forwards the data it reads to an access point capable of locating the terminal by fingerprinting.

U.S. Pat. No. 7,242,303 describes a similar solution, which uses a service centre to handle emergencies in a building.

In U.S. Pat. No. 7,388,490, the tag-reader solution is used for locating emergency calls from VOIP terminals, wherein the terminal, equipped with a reader, reads the data coming from the tags and relays them in a wireless manner to a server, which then compares them with an internal database to determine the caller's location.

The solutions presented in the above-mentioned U.S. Pat. No. 7,589,616, U.S. Pat. No. 7,242,303 and U.S. Pat. No. 7,388,490 aim at relatively locating a terminal within a building (room, area or even relative coordinates, "indoor"): therefore, they are based on the use of a server capable of knowing the geography of the place where location is being carried out (in particular the position of the reference tags) and of processing the data transmitted by the tags and relayed by the reader in order to calculate the position of the object associated with the reader itself.

In the most general cases, e.g. location of emergency calls, the position information is useful for the emergency centre, which does not know the geography of the place (in particular the tag arrangement inside a building) and therefore only needs to know whether the mobile terminal is inside the building or not: with the current methods described above, this is not possible.

SUMMARY OF THE INVENTION

It is therefore one object of the present invention to solve the above-mentioned problems of the prior art by providing a process for indoor location of mobile terminals in a mobile cellular telecommunication network (hereafter referred to also as cellular telephone network or cellular network) by a locating station which does not know the indoor environment where the mobile terminal is situated. Hereafter, also the term "mobile terminal" will be used to indicate a mobile cellular terminal, i.e. a mobile terminal adapted to establish communications of any kind with a mobile cellular telecommunication network.

It is another object of the present invention to provide a process for indoor location of mobile terminals in a mobile cellular telecommunication network which can use a minimal infrastructure based on low-consumption technologies, with small devices that can be easily integrated into both the terminals to be located and the indoor environment.

It is a further object of the present invention to provide a process for indoor location of mobile terminals in a mobile cellular telecommunication network which can avoid the use of locating servers placed between the mobile terminal to be located and the locating station that needs the positioning information, by sending the data directly from the terminal to the locating station, which data allow the latter to immediately locate the call, thereby advantageously reducing the response times of the emergency call service.

It is yet another object of the present invention to provide a process for indoor location of mobile terminals in a mobile cellular telecommunication network which can exploit the existing call location mechanisms without modifying the infrastructures of the cellular network.

These and other objects and advantages of the invention, which will become more apparent from the following description, are achieved through a process for indoor location of mobile terminals in a mobile cellular telecommunication network as set out in claim 1.

Furthermore, these and other objects and advantages of the invention are achieved through a system for indoor location of mobile terminals in a mobile cellular telecommunication network as set out in claim 7.

Finally, these and other objects and advantages of the invention are achieved through a mobile cellular terminal as set out in claim 12.

Preferred embodiments and non-obvious variants of the present invention are specified in dependent claims.

It will become immediately apparent that what is described herein may be subject to innumerable variations and modifications (e.g. in shape, dimensions, arrangements and parts having equivalent functionality) without departing from the protection scope of the invention as set out in the appended claims.

BRIEF DESCRIPTION OF THE DRAWINGS

The present invention will be described in detail below through some preferred embodiments thereof, which are only provided by way of non-limiting example, with reference to the annexed drawings, wherein.

DETAILED DESCRIPTION OF THE PREFERRED EMBODIMENTS

As will be explained more in detail below, the process and the system according to the present invention advantageously allow locating a mobile terminal in an indoor environment by using the mobile cellular telecommunication network and by adding a minimal infrastructure, which comprises one or more transmitter apparatuses in the environment and at least one receiver apparatus in the terminal.

As will be shown, in the most general case, the number of and the sites where the transmitter apparatuses are installed must ensure coverage of the areas of interest of the indoor environment, i.e. at every point the receiver apparatus must be able to receive the signal from at least one of them. In addition, said transmitter apparatuses can transmit an identifier that allows the locating station, placed outside the indoor environment of the mobile terminal to be located, to directly associate the geographic address of the place where the terminal is situated. All this can be done by relying on mechanisms for locating emergency calls coming from fixed terminals, which can determine the caller position by using a database associating the number of the fixed calling terminal with its geographic address; in one possible embodiment of the invention, the transmitter apparatuses transmit the telephone number of the fixed telephone present in the building: said identifier is received by the receiver apparatus present in the mobile terminal and is then sent to an external locating station through the cellular telephone network. Transmission of data for location purposes over the telephone network is already provided by the location standards defined by OMA and 3GPP.

In the more general case of multiple fixed terminals present inside the indoor environment where the mobile terminal to be located is situated, it is possible to have the transmitter apparatuses transmit a different identifier corresponding to the telephone number of the fixed terminal present in the area of the transmitter apparatus: more accurate information is thus obtained, thereby allowing the locating station to receive, in addition to the geographic address, also an indication of the area where the terminal to be located is situated; in those areas where there are no fixed terminals, the transmitter apparatuses may transmit the main telephone number of the building.

Of course, the telephone number is only one example of an identifier to be transmitted to a locating station for locating the terminal, which example can be easily implemented thanks to the modern locating techniques.

Figure 1:
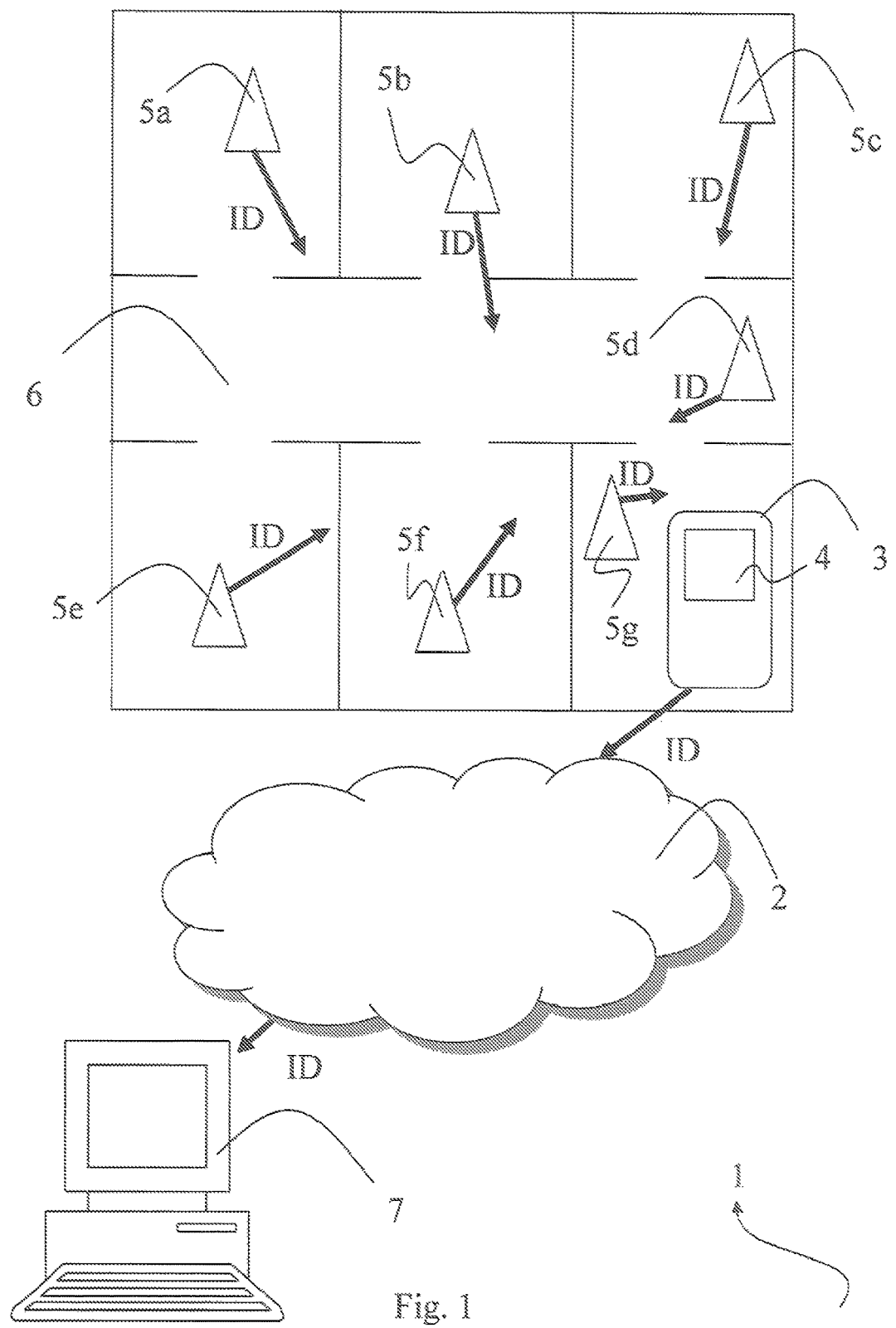
FIG. 1 is a diagram representing a preferred embodiment of the system according to the present invention.

In particular, the system and the process according to the present invention are advantageously applicable to Location Based Services (LBSs), which are value-added services that utilize the knowledge of the geographic position of a mobile user in order to provide, depending on said geographic position and on the surrounding context, appropriate responses to his/her needs. One such application will be illustrated later on. With particular reference to FIG. 1, it can be noted that the system 1 for locating a mobile cellular terminal 3 equipped with a transceiver apparatus for communicating with a mobile cellular telecommunication network 2 inside an indoor environment 6 in accordance with the present invention comprises:
- at least one transmitter apparatus of a plurality of transmitter apparatuses 5a-5g adapted to transmit at least one identifier ID;
- at least one mobile cellular terminal 3 equipped with at least one receiver apparatus 4 adapted to receive said identifier ID and a transceiver apparatus capable of relaying it to the mobile cellular telecommunication network 2;
- at least one locating station 7 adapted to receive the identifier ID through the cellular telephone network 2, relayed by the transceiver apparatus of the mobile terminal 3, and capable of locating said mobile terminal 3 depending on said received identifier ID.

The process for indoor location of the mobile cellular terminal 3 in a mobile cellular telecommunication network 2, preferably carried out by a system 1 like the one described above, comprises the following steps, wherein:

a) at least one of said transmitter apparatuses 5a-5g present inside said indoor environment 6 transmits at least one identifier ID of said indoor environment 6 where said transmitter apparatus 5a-5g is situated;

b) the receiver apparatus 4 of said mobile terminal 3 receives said identifier ID transmitted by at least one of said transmitter apparatuses 5a-5g;

c) the transceiver apparatus of said mobile terminal 3 relays the identifier ID to the locating station 7 through the mobile cellular telecommunication network 2; and d) the locating station 7 locates the mobile terminal 3 depending on the identifier ID relayed by the mobile terminal 3 itself through the cellular telephone network 2.

As a wholly equivalent alternative, the mobile terminal 3 may send to the locating station 7, through the mobile cellular telecommunication network, any data associated with the identifier ID received from the transmitter, based on which said station 7 can determine the original identifier ID, e.g. an encrypted version thereof.

As concerns the position of the transmitter apparatuses 5a-5g, it must be such as to allow coverage of the indoor environment 6 of interest, so that the receiver apparatus 4 associated with the mobile terminal 3 can communicate with at least one of them, placed in areas of the indoor environment 6 where the mobile terminal 3 must be located.

For example, the system 1 according to the present invention, shown in FIG. 1, comprises seven transmitter apparatuses 5a-5g; the receiver apparatus 4, from the position where it is situated, can communicate with the transmitter apparatus 5g.

Figure 2:
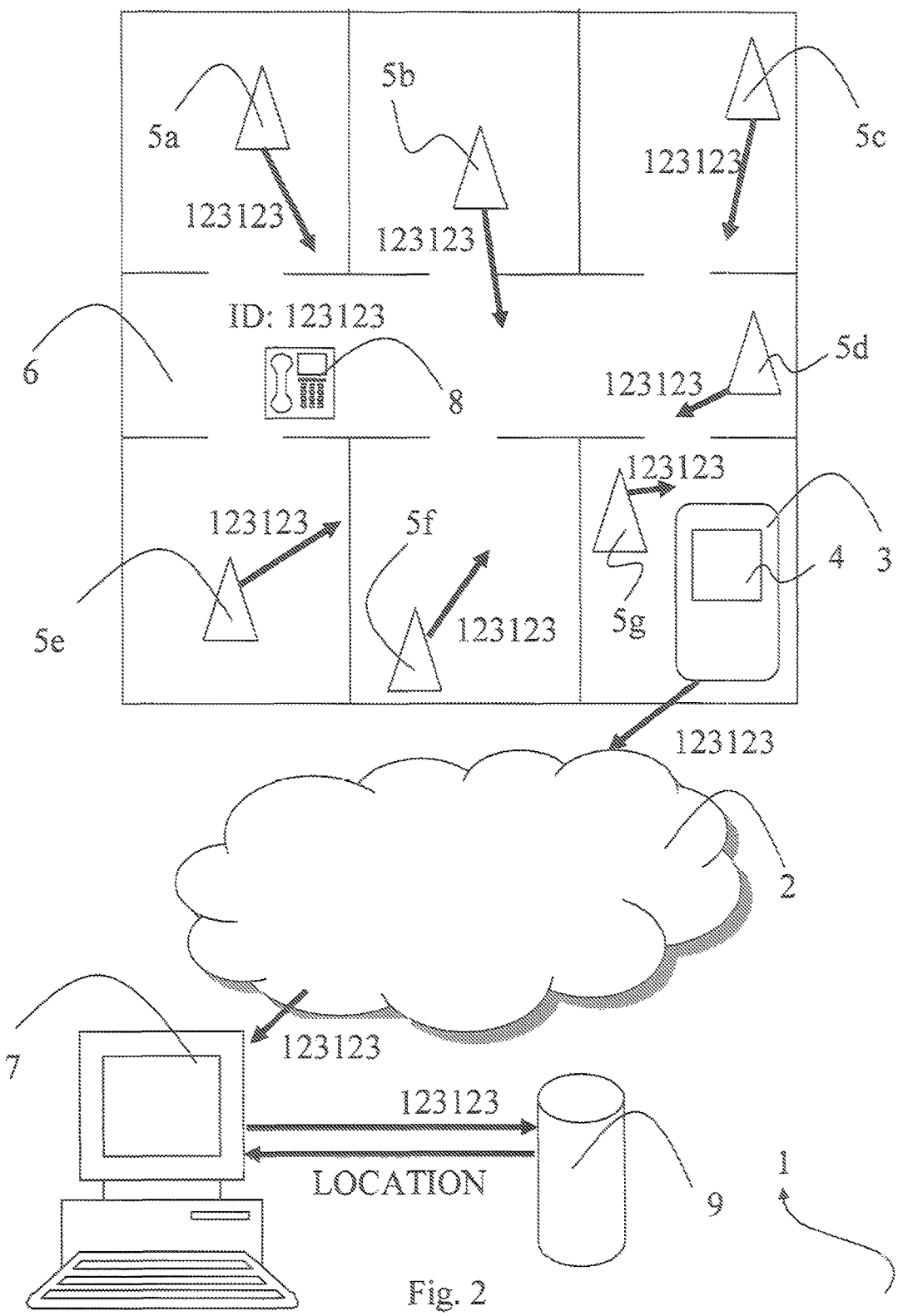
FIG. 2 shows the system of FIG. 1 during a step of the process according to the present invention.

According to a preferred embodiment of the invention like the one shown in FIG. 2, it is conceivable that all transmitter apparatuses 5a-5g transmit the same identifier ID of the indoor environment 6 where they are placed: said identifier may include, for example, the telephone number 123123 of a fixed terminal 8 present in the indoor environment 6, i.e. a fixed telephone. By way of example, assuming that an emergency call must be located, said identifier 123123 received by the receiver apparatus 4 associated with the mobile terminal 3, and relayed by the mobile terminal 3 to a locating station 7 (in this case the station that receives the emergency call) through the cellular telephone network 2, allows the locating station 7 to determine the geographic address (LOCATION) of the indoor environment 6, e.g. by using existing databases 9 already available, which associate a geographic address LOCATION with a fixed telephone number 123123. The locating station 7 comprises at least one server (generally consisting of a combination of hardware and software devices) or any other apparatus capable of receiving and interpreting the identifier ID or data associated therewith received from the mobile terminal 3 through a mobile cellular telephone communication, and of determining through it the position of the mobile terminal 3. Advantageously, said station 7 may use a database 9 accessible to the server, which database contains an association between the received identifier ID and data relating to the position of the transmitter 5a-5g that transmitted it to the mobile terminal 3.

Additionally, the locating station 7 may react to the reception of the identifier ID by means of a communication confirming said reception (this option is not shown in the drawings). This is especially important when the system 1 is applied to an emergency call location system, in which case the user of the mobile terminal normally wants to be sure that his/her emergency call has been received.

It should be noted that the transmission of data for location purposes over the telephone network 2 is already provided by the location standards defined by OMA and 3GPP: both of these standards require that messages be exchanged between the mobile terminal 3 and the cellular telephone network 2, which messages contain data including:
- telephone number of the terminal 3 to be located;
- location technique identifier;
- data and measurements dependent on the location technique in use.

In this case it will be sufficient to enter an identifier of the technique in use and the telephone number 123123 of the fixed terminal 8 into the data field.

Figure 3:
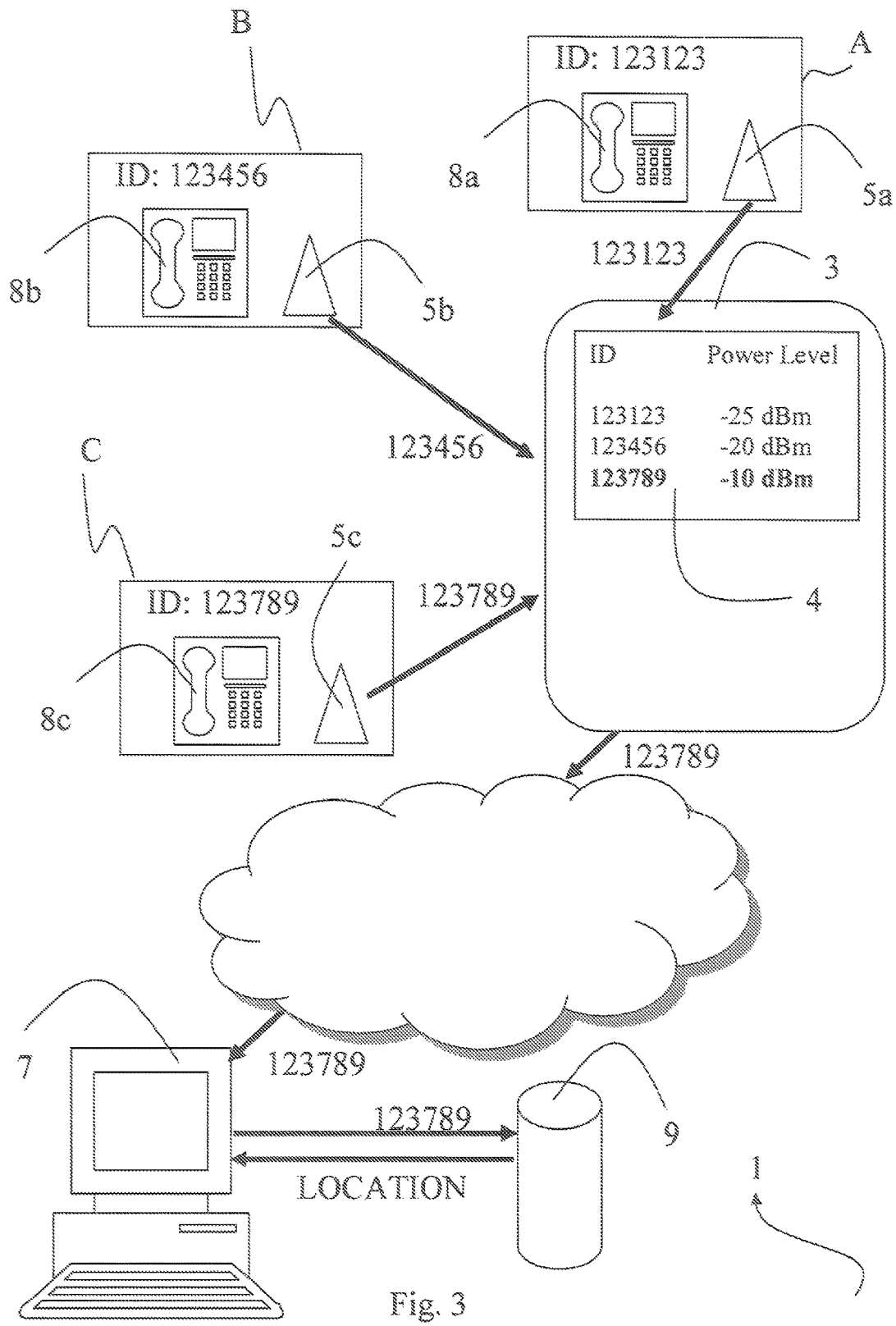
FIG. 3 shows the system of FIG. 1 in another possible embodiment of the process according to the present invention.

In another possible embodiment of the invention, wherein there is more than one fixed terminal, it is conceivable that the transmitter apparatuses 5a-5g are programmed with different telephone numbers depending on which fixed terminal 8a-8c they are closest to. With reference to FIG. 3, there is shown an example of implementation of the process for locating an emergency call based on the system 1 shown in FIG. 2, wherein the receiver apparatus 4 associated with a mobile terminal 3 receives the identifier from three different transmitter apparatuses 5a-5c positioned in three indoor environments A, B and C, respectively, and selects the nearest one for relay to the locating station 7 through the cellular telephone network 2. In particular, the receiver apparatus 4 of the mobile terminal 3 receives three different identifiers from three different transmitter apparatuses 5a-5c, corresponding to the telephone numbers 123123, 123456, 123789 of three fixed communication terminals 8a-8c present in the indoor environments A, B and C, in the proximity of which there is the mobile terminal 3: each transmitter apparatus 5a-5c thus transmits the telephone number of the corresponding fixed communication terminal 8a-8c present in the area where it is situated. Of course, the three indoor environments may be three different rooms of the same building, three different apartments or floors of the same building, or three adjacent buildings of a densely urbanized area in any place. The receiver apparatus 4 associated with the mobile terminal 3 can estimate the distance from said transmitter apparatuses, e.g. by measuring the power level at which the identifier ID is received from the three transmitter apparatuses 5a-5c, and selects the one received with the highest power (e.g. the identifier 123789) for relay to the locating station 7 through the telephone network 2. The locating station 7, by means of the available database 9, associates the position of the mobile terminal 3 with the geographic address (LOCATION) of the fixed terminal 5c (and of the corresponding indoor environment C) whose telephone number is 123789, which corresponds to the one received as an identifier ID. More in general, it is sufficient that the database 9 contains one piece of information associating the received identifier ID with the position of the indoor environment where the transmitter apparatus 5a-5g that sent it to the mobile terminal 3 is situated.

Of course, the use of the received power is only one example of a step of the process for selecting the identifier 123789 transmitted by the transmitter apparatus 5c closest to the terminal 3: in fact, it is possible to use any other method that allows the mobile terminal 3 to estimate the distance of the transmitter apparatuses (e.g. based on signal flight time measurements), without nevertheless departing from the protection scope of the present invention.

In the examples of the system 1 and process thereof shown in the drawings, reference is made to a particular and exemplary case of a service for locating emergency calls in indoor environments; it is however apparent to those skilled in the art that the system 1 and the process according to the present invention are also applicable to any other context wherein a mobile terminal placed in an indoor environment is to be located by an external application outside said environment.

Of course, also the use of the telephone number is just one example of an identifier of the indoor environment where the mobile terminal is to be located: it is in fact apparent that the system 1 and the process according to the present invention may use any other identifier (room number, hall name, building wing, etc.) which allows a locating station to determine the address or position of the indoor environment where the mobile terminal is to be located. In this manner, one can use a minimal infrastructure inside the coverage area of the location system, consisting of a plurality of transmitter apparatuses capable of communicating with a receiver apparatus built in the terminal, thus avoiding the need for using special locating means and procedures in the indoor environment and in the mobile terminal.

From a technical viewpoint, the system 1 and the process thereof can be implemented by using technologies already known in the art. In particular, the RFID technology is well suited to the purposes of the invention, in that tags can be used as transmitter apparatuses, and the reader built in the mobile terminal to be located can be used as a receiver apparatus. The RFID technology, which is currently being standardized as far as location is concerned, is a low-cost, low-consumption technology that uses small devices which can be easily integrated with other technologies: in fact, RFID platforms based on Wi-Fi IEEE802.11 standards are available which can be easily integrated into state-of-the-art mobile terminals already using this technology; another option is the ZigBee IEEE802.15 technology, which is widely employed in sensor networks.

It is also conceivable to arrange such tags in places that allow easy configuration and maintenance: in one possible embodiment of the system 1 according to the present invention, the tags can be directly integrated into the fixed communication terminals 8a-8c (e.g. fixed or cordless telephones of a common fixed telephone network) present in the indoor environment 6, so that said tags can share the power supply with the fixed terminals, said tags being programmed to transmit, as an identifier, the telephone number of the fixed terminal into which they are integrated.

The present invention further comprises at least one transmitter apparatus 5a-5g associated with at least one fixed terminal, wherein RFID tags are directly integrated into the telephone receptacles present in the indoor environment 6, so that said tags can share the power supply with the telephone receptacles.

Another possible embodiment of the system 1 according to the present invention exploits the increasing presence of wireless access points within buildings, which can be used as transmitter apparatuses, and the increasing integration of wireless interfaces in the currently available terminals: in this case, it is conceivable to use the IP (Internet Protocol) address associated with the access points as an identifier of the indoor environment for external applications using databases associating the IP address with the geographic address of the access point.

As aforementioned, the present invention can be implemented, for example, to provide LBSs (Location Based Services) in buildings or areas covered by a cellular telecommunication network, but not covered by a GNSS locating system.

Figure 4:
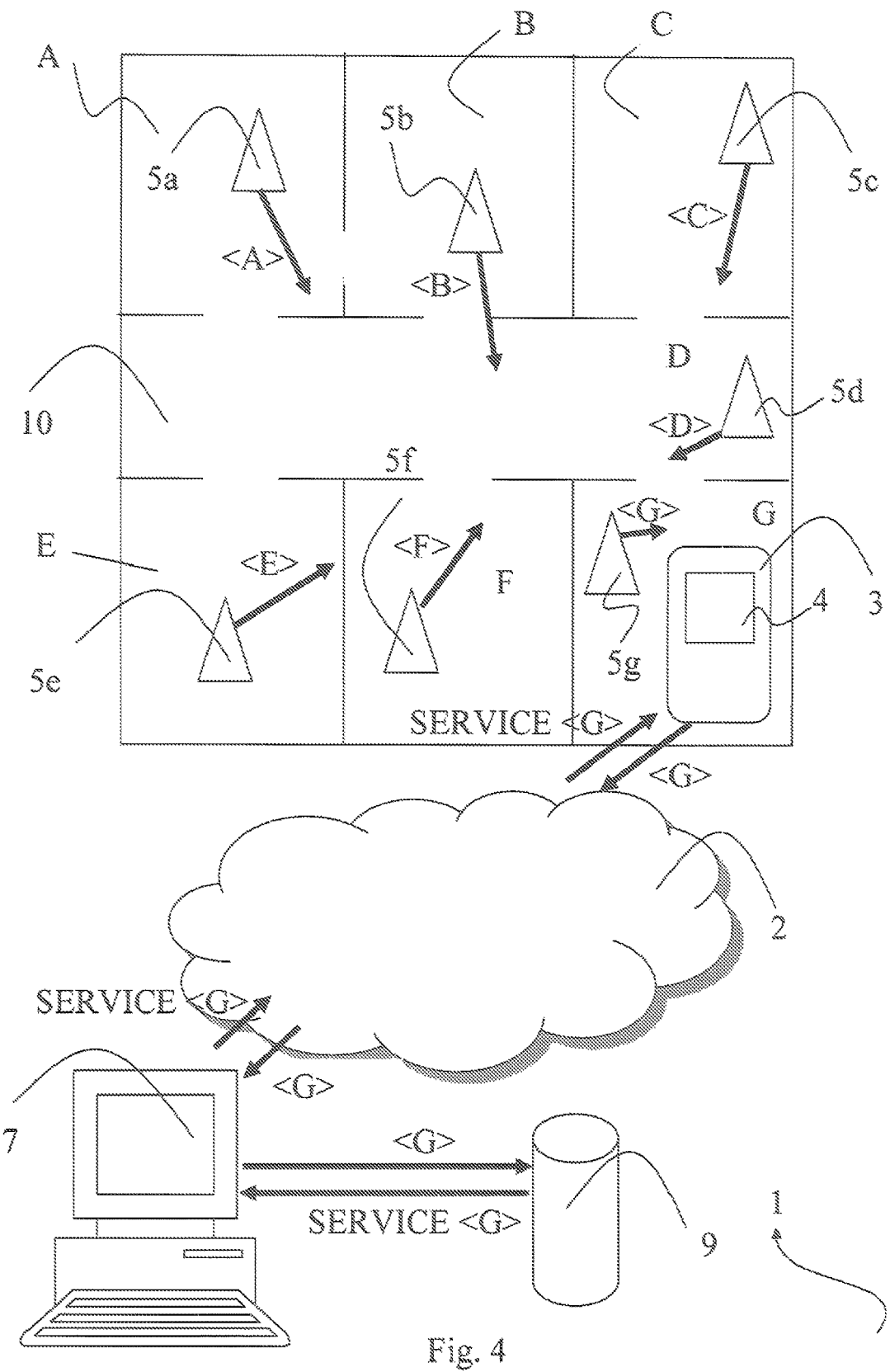
FIG. 4 shows the system of FIG. 1 in yet another possible embodiment of the process according to the present invention.

FIG. 4 illustrates another embodiment of the invention for providing an LBS-type service within an indoor area 10. The building to be served (e.g. a museum or a large shopping centre) is scattered with transmitters, each one identifying a certain indoor area or environment A-G characterized by the presence of particular elements of interest (work of art, shop, type of product being sold, etc.). In this case, the identifiers ID <A>-<G> may identify an indoor area or environment where the service provider wants to offer the mobile terminals situated therein a "location based" service, such as, for example, information about the elements of interest present in the coverage area of the transmitter to which the mobile terminal 3 is locked, or anyway of the closest transmitter that is transmitting a certain identifier. By way of example, the LBS system may also provide the mobile terminal 3 with software applications required for using or interacting with objects or elements placed near the transmitter 5a-5g or anyway within its radio coverage area.

The mobile cellular terminal 3 is situated in the indoor area 10 where there are the transmitter apparatuses 5a-5g, each transmitting its own identifier (<A>-<G>) receivable by the mobile terminal through its own receiver apparatus 4. Let us assume that, by using any method of estimate, the mobile terminal 3 establishes that it is situated in the area of competence of the transmitter 5g that sent the identifier <G>. At this point, the mobile terminal 3 sends said identifier or any data associated therewith to the server of the locating station 7 by means of a communication with the cellular network 2, e.g. by sending an SMS message to a service centre through which the locating station 7 can be reached. The station 7 obtains the position of the mobile terminal 3 (e.g. hall area, room or floor name or number, wing of a building, station name, etc.) and the service SERVICE <G> associated with the position or area of competence defined by the transmitter 5g, and supplies it to the mobile terminal, for example, through the cellular network 2. This is possible because the transmission of the SMS message generally also requires the transmission of the calling number, so that the server of the locating station 7 can identify the mobile terminal 3 from which it has received the SMS message and possibly also reply thereto.

The service may typically comprise the provision of information of any nature: commercial information (e.g. advertising a product positioned near the mobile terminal), museum information (e.g. multimedia data with text, audio tracks, images or videos concerning a work of art placed near the mobile terminal), location information (e.g. "You are near a toy shop", and so forth), which at any rate depend on the position of the mobile terminal 3 as detected by the locating station 7 based on the identifier <A>-<G> received.

The service offered by the server of the locating station 7 may consist of a service of any kind that can be provided, whether directly or indirectly, by the server of the locating station 7, such as, for example, sending an alert communication (voice call or SMS message) to at least one fixed or cellular telephone user, activating equipment present in the indoor environment where the mobile terminal 3 is situated, and the like. The locating station 7 can establish the position of the mobile terminal 3 with a certain degree of accuracy. The degree of accuracy depends, of course, on the radio coverage area of each transmitter 5a-5g and therefore, in short, on the power at which the identification signals <A>-<G> are transmitted and on the antennas' directivity and radiation diagram; such characteristics can be established when designing the system 1, and in some cases they can be modified in operation.

The cost of the cellular telephone communication from the mobile terminal 3 to the station 7 may even be null or very low, in that it may be totally or partially paid by the LBS service provider because, for example, it may be included in the cost of the service itself. The communication parameters (number to be dialled, message transmission protocol) may be contained in an application executable by the mobile terminal 3, which controls the interaction between the mobile terminal 3 and the other devices of the system 1.

In general, these services may also be provided to the mobile terminal through a way of communication alternative or additional to the cellular telephone network 2. If, for example, the transmitters 5a-5g are implemented through access points connected via a LAN, WLAN or WAN network to the locating station 7, the latter can provide the mobile terminal 3 with the LBS services of the system 1 through the access point that sent the location identifier <A>-<G> received by the mobile terminal 3 itself, in the case wherein these access points can be reached by the locating station 7. It is therefore presumably capable of receiving the additional data of the service(s) to be delivered, in that the mobile terminal 3 is still within the coverage area of said Wi-Fi access point. Advantageously, the mobile terminal can monitor the presence of transmitter apparatuses for indoor location on any radio interface (e.g. Wi-Fi, UHF RFID, Zigbee) used by its receiver apparatus 4, which only operates for limited cyclic time intervals separated by longer idle periods, in order to minimize the increase in the energy consumption of the mobile terminal due to the presence of the radio receiver device (or radio transceiver device, if passive RFID devices are used) 4 in addition to the cellular telephone transceiver device (e.g. of the GSM/GPRS/EDGE and/or UMTS/HSPA and/or LTE type) included by definition in the mobile cellular telephone terminal 3.

It is advantageous that, if the mobile terminal 3 is equipped with a GNSS locating device (e.g. GPS, GLONASS or Galileo) and with a memory where one can store (e.g. through a user interface) the position of the areas where there is an indoor location system 1, when the mobile terminal detects to have entered the area covered by said system because its distance from that position is shorter than a predetermined value, the receiver apparatus 4 will be turned on automatically (if not yet active) in order to listen to the transmitter apparatuses 5 (or to try to activate them if passive RFID tags are used). Vice versa, when the terminal exits the area covered by the system 1, the receiver apparatus 4 can be automatically turned off.

Of course, as an alternative or in addition, it is also possible that the terminal alerts the user through any audible and/or visual signal about the presence in the area of a system 1 stored by whatever means in the mobile terminal 3. Through input operations, the user can manually activate the receiver apparatus 4 and set it up for operating within the system 1.

Another useful feature is the possibility for the terminal to relay the identifier ID or <A>-<G> to the cellular telephone network when any predetermined event occurs, which can be defined by the user or by the manufacturer of the terminal 3, and which the terminal itself can detect. This event may consist of various occurrences, such as, for example:

- an input operation (e.g. pressing a specific key) executed by the user on any user interface (keyboard, touch screen, etc.);
- making a voice call to a preset telephone user (e.g. an emergency number 112 or 911) or sending an SMS message to a preset number; in such a case, the identifier (ID;A-G) or data associated therewith can be encapsulated into a specific field of the data flow emitted by the mobile terminal in order to make said call or send said SMS message.
- detecting that a predetermined period of time has elapsed since a predefined time instant;
- any other event detected by hardware or software means associated with the mobile terminal 3, such as, for example, presence of smoke or gas, (body or ambient) temperature values outside a predetermined range, geographic position outside a predetermined area, and the like.

Of course, many variations are possible from a technologic standpoint, and those mentioned above are not intended to be exhaustive in that some elements may be replaced with other technically equivalent ones.

The features as well as the advantages of the system 1 and of the process according to the present invention are nonetheless apparent from the above description.

A first advantage is that, thanks to the process according to the present invention, mobile terminals situated in indoor environments can be located by an external locating station that does not know the indoor environment concerned, in particular the internal structure thereof. For example, mobile terminals can be located during an emergency call, which service has become mandatory for network operators, even though such terminals are situated within indoor environments, by using a proven technology for fixed terminals.

A second advantage is that the process according to the invention makes it possible to limit the impact upon the internal infrastructure of buildings and the modifications to the architecture of terminals known in the art: as a matter of fact, it is necessary to arrange transmitter apparatuses within the indoor environment and a receiver apparatus within the terminals capable of receiving signals from the transmitter apparatuses, which use widespread technologies often already available in buildings. All this can be implemented by, for example:

- using proven technologies, such as those based on WLAN IEEE802.11 infrastructures, with transmitter apparatuses widely used in indoor environments, such as wireless access points, and in the terminals, in the form of clients;
- using low-cost and low-consumption RFID platforms, which are currently being standardized as far as location is concerned, and which utilize devices that can be easily integrated with other technologies and can be gradually deployed in the indoor environment.

A further advantage of the present invention, which is attained when using RFID tags as transmitter apparatuses, is that such devices can be powered (or telepowered) and possibly monitored/configured remotely, since they can be easily integrated into the fixed telephone terminals or into the telephone receptacles.

Another advantage is that the process according to the invention makes it easy to use Wi-Fi access points as transmitter apparatuses and the Wi-Fi client interface as receiver apparatuses associated with the mobile terminals; this particular embodiment reduces the number of modifications required on the transmission side (access points are available in many buildings), while any modifications on the receiver side are only software ones, since a large number of modern mobile state-of-the-art terminals already have built-in hardware Wi-Fi interfaces.

Yet another advantage of the present invention is that the process according to the invention makes it possible to locate the mobile terminal by sending data identifying the position of the mobile user, transmitted by the transmitter apparatuses and received by the receiver apparatus, directly to the locating station through the cellular network, without having to use dedicated locating means and procedures within the mobile terminal and without requiring any modification to the cellular network.

Finally, it is important to point out that the present invention is applicable to indoor environments which are generally very crowded (such as shopping centres, museums and the like) and which cannot be covered by a GNSS service while however being covered by the mobile cellular telecommunication network; as a matter of fact, it has been in the interest of the operators of such networks to cover these environments, for they generate considerable traffic volumes.

The preferred embodiments of the invention described herein may, of course, be subject to further modifications and variations without departing from the inventive idea. In particular, numerous variations and modifications will be immediately apparent to those skilled in the art, which are functionally equivalent to those described herein and still fall within the protection scope of the invention as set out in the appended claims, which are intended as an integral part of the present invention.

The invention claimed is:

1. A process for determining a geographic address of a mobile terminal located in an indoor environment, through a system comprising at least one Wi-Fi access point, present inside the indoor environment, wherein said at least one Wi-Fi access point is provided with an identifier of a landline terminal of a common fixed telephone network that is present in said indoor environment, wherein the mobile terminal is equipped with both a Wi-Fi receiver apparatus capable of receiving data transmitted by at least one of said Wi-Fi access points and a transceiver apparatus capable of communicating with a cellular mobile telecommunication network, wherein the identifier of the landline terminal includes at least one of an IP address or a telephone line number, the identifier individuating univocally said landline terminal in said common fixed telephone network, the process comprising:

a) transmitting, by at least one of said Wi-Fi access points present in said indoor environment, said identifier of said landline terminal;

b) receiving, by said Wi-Fi receiver apparatus of said mobile terminal, the transmitted by at least one of said Wi-Fi access points;

c) relaying, by said transceiver apparatus of said mobile terminal, the identifier to a locating station that is external to said indoor environment and that is unaware of the geographic address of the indoor environment through said cellular mobile telecommunication network, wherein the locating station determines a geographical address of said indoor environment based on the identifier of the landline terminal by consulting a database accessible to said locating station and maintained by an operator of the common fixed telephone network to which said landline terminal pertains, said database comprising associations between the identifier of the landline terminal and the geographical address of said indoor environment, wherein said database is external to said indoor environment and wherein said database is configured to determine geographic addresses of multiple indoor environments, d) returning the geographical address of the indoor environment to the locating station and determining that a geographical address of said mobile terminal is the geographical address of said indoor environment associated with the identifier in said existing database.

2. The process according to claim 1, wherein step b) further comprises:

receiving a plurality of different identifiers from said Wi-Fi access points, wherein at least some of said Wi-Fi access points are associated with different landline terminals; and selecting said the at least one of said identifiers to be transmitted to said locating station from among said plurality of different identifiers, said selected identifier being the one estimated as being transmitted by the Wi-Fi access point nearest to said mobile terminal, wherein step d) further comprises associating said selected identifier of said nearest Wi-Fi access point with a geographic address thereof through said database.

3. The process according to claim 1, wherein the at least one of said identifiers includes at least one telephone number of one of said landline terminals present inside said indoor environment, and wherein said database contains at least information associating the telephone number with its own geographic address.

4. A process according to claim 1, wherein:

said Wi-Fi access points are WLAN access points and said Wi-Fi receiver apparatus associated with said mobile terminal is a WLAN client, said at least one of said identifiers comprises at least one IP address, and said database contains at least information associating with said IP address its own geographic address.

5. A system for determining a geographic address of a mobile terminal located in an indoor environment, wherein said indoor environment includes a landline terminal of a common fixed telephone network, the mobile terminal being equipped with a transceiver apparatus capable of communication with a cellular mobile telecommunication network, the system comprising:

Wi-Fi access points placed inside the indoor environment, wherein said Wi-Fi access points are provided with identifiers of the landline terminal of the common fixed telephone network and are adapted to transmit, to said mobile terminal, the identifiers of the landline terminal, said identifiers including an IP address or a telephone line number, the identifiers individuating univocally said landline terminal in said common fixed telephone network, wherein at least one of said Wi-Fi access points transmits at least one of said identifiers of said landline terminal, a Wi-Fi receiver apparatus, wherein said mobile terminal is equipped with both said Wi-Fi receiver apparatus capable of receiving data transmitted by said Wi-Fi access points present inside said indoor environment and the transceiver apparatus capable of communicating with the cellular mobile telecommunication network, wherein said Wi-Fi receiver apparatus is capable of receiving at least one of said identifiers of said landline terminal from said Wi-Fi access points and said transceiver apparatus is adapted to relay the at least one of said identifiers to a locating station that is external to said indoor environment and that is unaware of the geographic address of the indoor environment through said cellular mobile telecommunication network;

said locating station being adapted to determine a geographical address of said indoor environment based on said at least one of said identifiers received from said transceiver apparatus, wherein said locating station consults at least one database accessible to said locating station and maintained by an operator of the common fixed telephone network to which said landline terminal pertains, said database comprising information associating said at least one of said identifiers of said landline terminal with data relating to the geographical address of said indoor environment where the Wi-Fi transmitter that transmitted the at least one of said identifiers is situated, wherein the geographic address of said landline terminal in said indoor environment is determined as a geographical address of said mobile terminal, wherein said at least one database is external to said indoor environment and wherein said at least one database is configured to determine geographic addresses of multiple indoor environments.

6. The system according to claim 5, wherein said Wi-Fi access points are WLAN access points and said Wi-Fi receiver apparatus associated with said mobile terminal is a WLAN client.

7. A mobile terminal for communicating with a cellular mobile telecommunication network through which it is possible to transmit identifiers to a locating station, said mobile terminal comprising:

a Wi-Fi receiver apparatus capable of receiving identifiers transmitted by Wi-Fi access points present inside an indoor environment, wherein the Wi-Fi access points are provided with identifiers of at least one landline terminal of a common fixed telephone network present within said indoor environment, wherein the identifiers include at least one of an IP address or a telephone line number, the identifiers individuating univocally said at least one landline terminal in said common fixed telephone network where said Wi-Fi access points and said at least one landline terminal are situated;

a transceiver apparatus configured to transmit at least one of said identifiers received by said Wi-Fi receiver apparatus and associated with the at least one landline terminal to said locating station through said cellular mobile telecommunication network, wherein said locating station is maintained by an operator of the common fixed telephone network to which said at least one landline terminal pertains, wherein said locating station is external to said indoor environment and is unaware of a geographic address of the indoor environment, wherein said locating station is used to determine the geographical address of said at least one landline terminal based on said at least one of said identifiers relayed by said mobile terminal through said cellular mobile telecommunication network, wherein said locating station comprises at least one database accessible to said locating station, said database comprising information associating said at least one of said identifiers with the geographical address of said indoor environment, wherein the geographic address of said at least one landline terminal is determined as a geographical address of said mobile terminal, wherein said at least one database is external to said indoor environment and wherein said at least one database is configured to determine geographic addresses of multiple indoor environments.

8. The mobile terminal according to claim 7, wherein the Wi-Fi receiver apparatus is cyclically activated only for limited time intervals separated by longer idle periods.

9. The mobile terminal according to claim 7, wherein:
the mobile terminal includes a GNSS locating device and a memory, wherein a position of at least one indoor environment is stored into said memory, and
said Wi-Fi receiver apparatus is activated when the GNSS locating device detects that a distance of the mobile terminal from said position is shorter than a preset value.

10. The mobile terminal according to claim 7, wherein the at least one of said identifiers associated therewith is automatically relayed to the locating station when a predetermined event occurs.

11. The mobile terminal according to claim 10, wherein:
said predetermined event comprises the mobile terminal making a call or sending an SMS message to a preset telephone user, and
the at least one of said identifiers is entered into a data flow emitted by the mobile terminal in order to make said call or send said SMS message.

* * * * *